(12) United States Patent
Kuwaoka

(10) Patent No.: US 7,263,407 B2
(45) Date of Patent: Aug. 28, 2007

(54) METHOD AND APPARATUS FOR PROCESSING DIGITAL AUDIO SIGNAL

(75) Inventor: Toshiharu Kuwaoka, Yokohama (JP)

(73) Assignee: Victor Company if Japan, Ltd., Yokohama (JP)

( * ) Notice: Subject to any disclaimer, the term of this patent is extended or adjusted under 35 U.S.C. 154(b) by 881 days.

(21) Appl. No.: 10/427,912

(22) Filed: May 2, 2003

(65) Prior Publication Data

US 2003/0236584 A1    Dec. 25, 2003

(30) Foreign Application Priority Data

Jun. 20, 2002    (JP)    ............................. 2002-180350

(51) Int. Cl.
*H03G 5/00*    (2006.01)
*G06F 17/00*    (2006.01)
(52) U.S. Cl. .......................................... 700/94; 381/98
(58) Field of Classification Search ................. 84/698; 381/61, 98, 101
See application file for complete search history.

(56) References Cited

U.S. PATENT DOCUMENTS 6,449,519 B1    9/2002    Kuwaoka

FOREIGN PATENT DOCUMENTS

JP    11-126097    *    5/1999

* cited by examiner

*Primary Examiner*—Sinh Tran
*Assistant Examiner*—Walter F Briney, III
(74) *Attorney, Agent, or Firm*—Louis Woo

(57) ABSTRACT

A digital audio signal has a sequence of samples. Extreme values in an audio waveform represented by the digital audio signal are detected. The extreme values include a maximum value and a minimum value. An audio frequency represented by the digital audio signal is detected in response to the number of samples between two temporally-adjacent extreme-corresponding samples. A difference between each extreme value and a value of a sample which immediately precedes the present extreme-corresponding sample is calculated. The calculated differences are multiplied by selected one of predetermined coefficients to get corrective values respectively. A decision is made as to whether or not the detected audio frequency is in one selected from predetermined frequency bands. When the detected audio frequency is in the selected frequency band, a corresponding corrective value is added to the maximum value and a corresponding corrective value is subtracted from the minimum value.

8 Claims, 7 Drawing Sheets

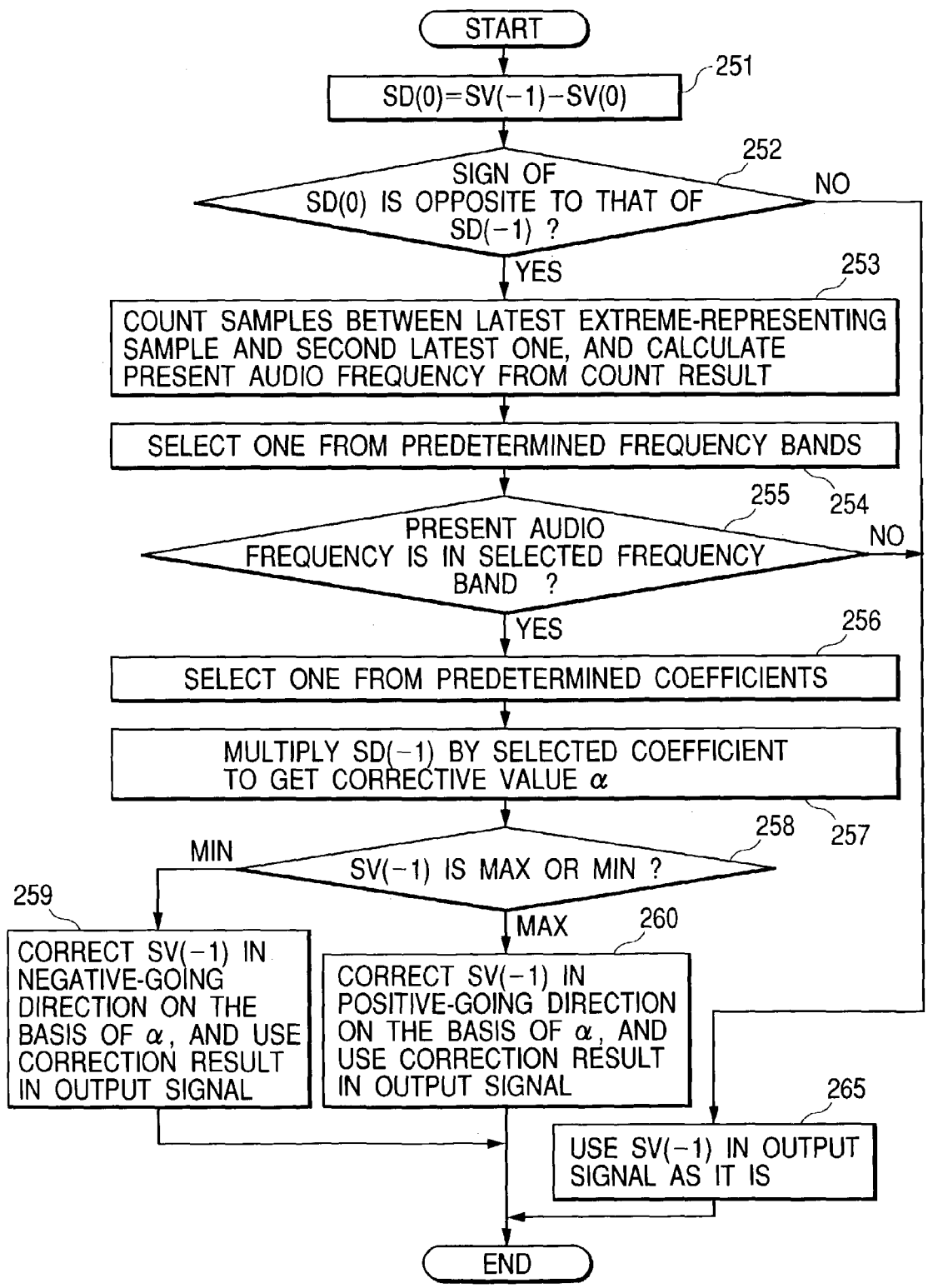

METHOD AND APPARATUS FOR PROCESSING DIGITAL AUDIO SIGNAL

BACKGROUND OF THE INVENTION

1. Field of the Invention

This invention relates to a method of processing a digital audio signal. In addition, this invention relates to an apparatus for processing a digital audio signal. Furthermore, this invention relates to a computer program for processing a digital audio signal.

2. Description of the Related Art

According to the CD standards, an analog audio signal is converted into a digital audio signal by sampling and quantizing processes with a sampling frequency fs of 44.1 kHz and a quantization bit number of 16. Generally, a sampling frequency and a quantization bit number are basic factors which determine the quality of audio contents represented by a resultant digital audio signal. A higher sampling frequency and a greater quantization bit number provide a better audio quality. In the case where a sampling frequency fs is 44.1 kHz, signal components having frequencies of 22.05 kHz or higher are cut off.

To improve audio quality, the DVD video standards and the DVD audio standards use a quantization bit number of 24 and a sampling frequency fs of 48 kHz, 96 kHz, or 192 kHz.

It is known to re-quantize and up-sample a digital audio signal of the CD standards into a digital audio signal of the DVD video standards or the DVD audio standards which corresponds to a sampling frequency of 48 kHz and a quantization bit number of 24. In this case, the audio waveform represented by the DVD digital audio signal is basically identical with that represented by the original CD digital audio signal, and the DVD digital audio signal also lacks signal components representing audio frequencies of 22.05 kHz or higher. Therefore, in this case, an improved audio quality can not be provided.

A brief explanation will now be given of conceivable systems which are not prior art against this invention. The conceivable systems are designed to add high-audio-frequency signal components to an original digital audio signal to get a modified digital audio signal representative of audio contents with enhanced presence in auditory sensation. In the conceivable systems, the addition of high-audio-frequency signal components to the original digital audio signal is independent of the audio frequency represented by the original digital audio signal. Therefore, it is difficult to add high-audio-frequency signal components to only components of the original digital audio signal which represent audio frequencies in a desired band or a limited band.

SUMMARY OF THE INVENTION

It is a first object of this invention to provide an improved method of processing a digital audio signal.

It is a second object of this invention to provide an improved apparatus for processing a digital audio signal.

It is a third object of this invention to provide an improved computer program for processing a digital audio signal.

A first aspect of this invention provides a method of processing a digital audio signal having a sequence of samples. The method comprises the steps of detecting extreme values in an audio waveform represented by the digital audio signal, the detected extreme values including a detected maximum value and a detected minimum value; counting samples between a sample corresponding to first one of the detected extreme values and a sample corresponding to second one of the detected extreme values to get a count result; detecting an audio frequency represented by the digital audio signal in response to the count result; calculating a difference between each of the detected extreme values and a value of a sample which immediately precedes a sample corresponding to the present detected extreme value; selecting one from predetermined frequency bands different from each other; selecting one from predetermined coefficients different from each other; multiplying the calculated differences by the selected coefficient to get corrective values respectively; deciding whether or not the detected audio frequency represented by the digital audio signal is in the selected frequency band; and when it is decided that the detected audio frequency is in the selected frequency band, adding, to the detected maximum value, corresponding one of the corrective values, and subtracting, from the detected minimum value, corresponding one of the corrective values.

A second aspect of this invention is based on the first aspect thereof, and provides a method wherein the predetermined coefficients are smaller than 1.0.

A third aspect of this invention provides an apparatus for processing a digital audio signal having a sequence of samples. The apparatus comprises means for detecting extreme values in an audio waveform represented by the digital audio signal, the detected extreme values including a detected maximum value and a detected minimum value; means for counting samples between a sample corresponding to first one of the detected extreme values and a sample corresponding to second one of the detected extreme values to get a count result; means for detecting an audio frequency represented by the digital audio signal in response to the count result; means for calculating a difference between each of the detected extreme values and a value of a sample which immediately precedes a sample corresponding to the present detected extreme value; means for selecting one from predetermined frequency bands different from each other; means for selecting one from predetermined coefficients different from each other; means for multiplying the calculated differences by the selected coefficient to get corrective values respectively; means for deciding whether or not the detected audio frequency represented by the digital audio signal is in the selected frequency band; and means for, when it is decided that the detected audio frequency is in the selected frequency band, adding, to the detected maximum value, corresponding one of the corrective values, and subtracting, from the detected minimum value, corresponding one of the corrective values.

A fourth aspect of this invention is based on the third aspect thereof, and provides an apparatus wherein the predetermined coefficients are smaller than 1.0.

A fifth aspect of this invention provides a computer program for enabling a computer to execute steps of processing a digital audio signal having a sequence of samples. The steps comprise detecting extreme values in an audio waveform represented by the digital audio signal, the detected extreme values including a detected maximum value and a detected minimum value; counting samples between a sample corresponding to first one of the detected extreme values and a sample corresponding to second one of the detected extreme values to get a count result; detecting an audio frequency represented by the digital audio signal in response to the count result; calculating a difference between each of the detected extreme values and a value of a sample which immediately precedes a sample corresponding to the present detected extreme value; selecting one from predetermined frequency bands different from each other; selecting one from predetermined coefficients different from each other; multiplying the calculated differences by the selected coefficient to get corrective values respectively; deciding whether or not the detected audio frequency represented by the digital audio signal is in the selected frequency band; and when it is decided that the detected audio frequency is in the selected frequency band, adding, to the detected maximum value, corresponding one of the corrective values, and subtracting, from the detected minimum value, corresponding one of the corrective values.

A sixth aspect of this invention provides an apparatus for processing a digital audio signal. The apparatus comprises first means for detecting an extreme in an audio waveform represented by the digital audio signal; second means for detecting a local audio frequency represented by the digital audio signal; third means for deciding whether or not the local audio frequency detected by the second means is in a limited frequency band; fourth means for, when the third means decides that the local audio frequency is in the limited frequency band, emphasizing the extreme detected by the first means; and fifth means for, when the third means decides that the local audio frequency is not in the limited frequency band, keeps unchanged the extreme detected by the first means.

A seventh aspect of this invention is based on the sixth aspect thereof, and provides an apparatus further comprising sixth means for changing the limited frequency band.

An eighth aspect of this invention is based on the sixth aspect thereof, and provides an apparatus further comprising sixth means for changing a degree of the emphasis by the fourth means.

A ninth aspect of this invention is based on the sixth aspect thereof, and provides an apparatus further comprising sixth means for keeping unchanged the audio waveform except for the extreme.

BRIEF DESCRIPTION OF THE DRAWINGS

FIG. 11 is a flowchart of a segment of a control program for a signal processing device in FIG. 10.

DETAILED DESCRIPTION OF THE INVENTION

A conceivable system for processing a digital audio signal which is not prior art against this invention will be explained below for a better understanding of this invention.

Figure 1:
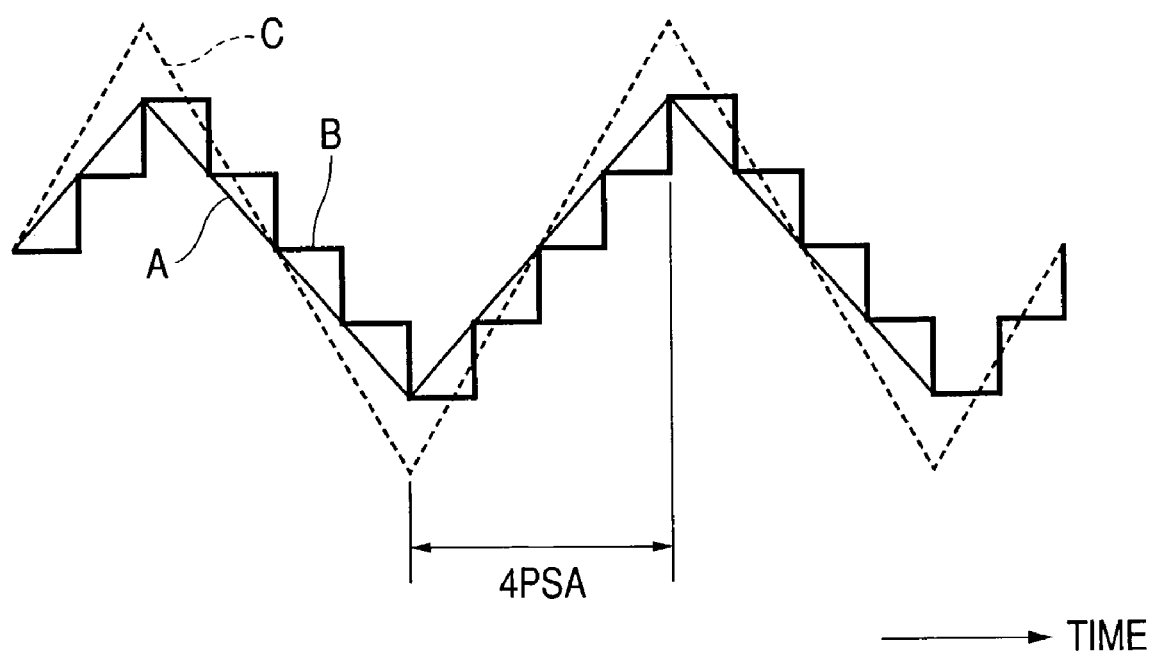
FIG. 1 is a time-domain diagram of the audio waveforms represented by digital signals in a conceivable system which is not prior art against this invention.

The conceivable system adds high-audio-frequency signal components to an input digital audio signal, and thereby processes the input digital audio signal into an output digital audio signal. With reference to FIG. 1, the input digital audio signal has a sequence of samples representing signal levels or signal values which vary as steps "B". There are 4 samples in a time interval 4 PSA equal to 4 times one sampling period PSA related to the input digital audio signal. The input digital audio signal represents an effective audio waveform "A".

The conceivable system detects every extreme value in the effective audio waveform "A" represented by the input digital audio signal. Here, every extreme value means every maximum value and every minimum value (every local maximum value and every local minimum value), that is, every peak and every valley. Furthermore, the conceivable system detects the middle value between every extreme value and a subsequent extreme value (for example, every maximum value and a subsequent minimum value). To enhance the clarity of audio contents, the conceivable system corrects successive samples starting from the sample representing the extreme value (for example, the maximum value) and ending at the sample representing the subsequent extreme value (for example, the subsequent minimum value). Specifically, the conceivable system calculates corrective values for the samples respectively. The corrective value for every sample depends on the signal level represented by the sample. The conceivable system adds the corrective values to the signal levels represented by the related samples existing in a time range where the values of the samples are greater than the middle value. On the other hand, the conceivable system subtracts the corrective values from the signal levels represented by the related samples existing in a time range where the values of the samples are smaller than the middle value. The correction of the samples causes the output digital audio signal which represents an effective audio waveform "C" having emphasized peaks and valleys relative to those in the original effective audio waveform "A" (see FIG. 1). The emphasized peaks and valleys mean the addition of high-audio-frequency signal components to the input digital audio signal.

In the conceivable system, the correction of samples is independent of the audio frequency represented by the input digital audio signal. Therefore, it is difficult to add high-audio-frequency signal components to only components of the input digital audio signal which represent audio frequencies in a desired band or a limited band.

FIRST EMBODIMENT

Figure 2:
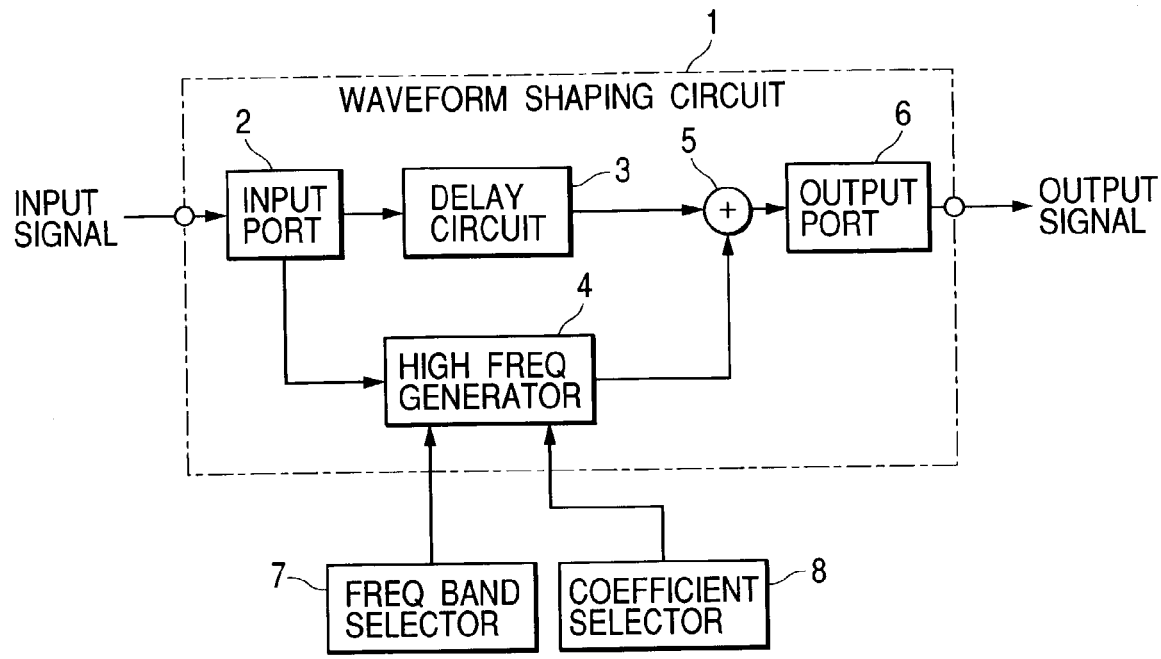
FIG. 2 is a block diagram of a digital-audio-signal processing apparatus according to a first embodiment of this invention.

FIG. 2 shows a digital-audio-signal processing apparatus according to a first embodiment of this invention. The apparatus of FIG. 2 includes a waveform shaping circuit 1, a frequency band selector 7, and a coefficient selector 8. The frequency band selector 7 and the coefficient selector 8 are connected with the waveform shaping circuit 1.

The waveform shaping circuit 1 includes an input port 2, a delay circuit 3, a high-frequency-signal generator 4, an adder 5, and an output port 6. The input port 2 is connected to the input terminals of the delay circuit 3 and the high-frequency-signal generator 4. The output terminal of the delay circuit 3 is connected to a first input terminal of the adder 5. The output terminal of the high-frequency-signal generator 4 is connected to a second input terminal of the adder 5. The high-frequency-signal generator 4 has control terminals connected to the frequency band selector 7 and the coefficient selector 8 respectively. The output terminal of the adder 5 is connected with the output port 6.

Preferably, the frequency band selector 7 and the coefficient selector 8 include switches which can be operated by a user.

The input port 2 in the waveform shaping circuit 1 receives an input digital audio signal having a sequence of samples. The input digital audio signal relates to a predetermined sampling frequency equal to, for example, 48 kHz, 96 kHz, or 192 kHz. Every sample in the input digital audio signal has a predetermined number of bits, for example, 24 bits. In other words, the input digital audio signal has a predetermined quantization bit number equal to, for example, 24. The input port 2 passes the input digital audio signal to the delay circuit 3 and the high-frequency-signal generator 4.

The high-frequency-signal generator 4 produces a corrective digital signal in response to the input digital audio signal and control signals fed from the frequency band selector 7 and the coefficient selector 8. The corrective digital signal represents high audio frequencies. The corrective digital signal has a sequence of samples corresponding to extreme-representing samples in the input digital audio signal. The high-frequency-signal generator 4 outputs the corrective digital signal to the adder 5.

The delay circuit 3 delays the input digital audio signal by a predetermined time. The delay circuit 3 outputs the delay-result digital audio signal to the adder 5. The delay circuit 3 implements timing adjustment which enables corresponding samples in the corrective digital signal and the corrective digital signal to simultaneously reach the adder 5.

The device 5 adds the corrective digital signal to the delay-result digital audio signal, and thereby corrects the delay-result digital audio signal into an output digital audio signal (a correction-result digital audio signal). The adder 5 feeds the output digital audio signal to the output port 6. The output port 6 passes the output digital audio signal to an external device.

The high-frequency-signal generator 4 responds to the control signal fed from the frequency band selector 7. The high-frequency-signal generator 4 stores data indicating a plurality of predetermined frequency bands which differ from each other. The high-frequency-signal generator 4 selects one from the predetermined frequency bands in response to the control signal fed from the frequency band selector 7. By operating the frequency band selector 7, the user can decide which of the predetermined frequency bands should be selected. The high-frequency-signal generator 4 detects the present audio frequency (present local audio frequency) represented by the input digital audio signal. The high-frequency-signal generator 4 determines whether or not the detected present audio frequency is in the selected frequency band. When it is determined that the detected present audio frequency is not in the selected frequency band, the high-frequency-signal generator 4 outputs a null digital signal or a "0" digital signal to the adder 5 as a disabled corrective digital signal. In this case, the delay-result digital audio signal propagates through the adder 5 without being processed. Then, the delay-result digital audio signal propagates through the output port 6 before reaching the external device as an output digital audio signal. On the other hand, when it is determined that the detected present audio frequency is in the selected frequency band, the high-frequency-signal generator 4 outputs an enabled corrective digital signal to the adder 5. In this case, the device 5 adds the corrective digital signal to the delay-result digital audio signal, and thereby corrects the delay-result digital audio signal into an output digital audio signal. The adder 5 feeds the output digital audio signal to the output port 6. Then, the output port 6 passes the output digital audio signal to the external device.

The high-frequency-signal generator 4 responds to the control signal fed from the coefficient selector 8. The high-frequency-signal generator 4 stores data indicating a plurality of predetermined coefficients which differ from each other. The high-frequency-signal generator 4 selects one from the predetermined coefficients in response to the control signal fed from the coefficient selector 8. By operating the coefficient selector 8, the user can decide which of the predetermined coefficients should be selected. When it is determined that the detected present audio frequency represented by the input digital audio signal is in the selected frequency band, the high-frequency-signal generator 4 produces an enabled corrective digital signal in response to the selected coefficient. The degree of the effectiveness of the corrective digital signal is decided by the selected coefficient. As previously mentioned, the high-frequency-signal generator 4 outputs the produced corrective digital signal to the adder 5.

In more detail, the high-frequency-signal generator 4 detects every extreme value in the audio waveform represented by the input digital audio signal. Here, every extreme value means every maximum value and every minimum value (every local maximum value and every local minimum value), that is, every peak and every valley. The high-frequency-signal generator 4 identifies every sample in the input digital audio signal which represents an extreme value (a maximum value or a minimum value). Also, the high-frequency-signal generator 4 identifies every sample in the input digital audio signal which immediately precedes an extreme-representing sample. Furthermore, the high-frequency-signal generator 4 detects the value represented by every sample in the input digital audio signal which immediately precedes an extreme-representing sample. The high-frequency-signal generator 4 calculates the difference between every extreme value and the value represented by the sample immediately preceding the extreme-representing sample. When it is determined that the detected present audio frequency represented by the input digital audio signal is in the selected frequency band, the high-frequency-signal generator 4 multiplies the calculated difference with the selected coefficient to get a corrective value for the extreme-representing sample. The high-frequency-signal generator 4 produces an enabled corrective digital signal in accordance with the corrective value. The high-frequency-signal generator 4 outputs the produced corrective digital signal to the adder 5. The corrective digital signal outputted to the adder 5 affects only extreme-representing samples in the delay-result digital audio signal. In other words, the corrective digital signal is ineffective with respect to samples other than extreme-representing samples. Therefore, only extreme values (maximum values and minimum values) in the audio waveform represented by the delay-result digital audio signal are corrected. The correction-result extreme values are reflected in the audio waveform represented by the output digital audio signal.

Preferably, the high-frequency-signal generator 4 includes a microprocessor unit (MPU), a digital signal processor (DSP), or a similar device which operates in accordance with a control program (a computer program) stored in its internal memory.

Figure 3:
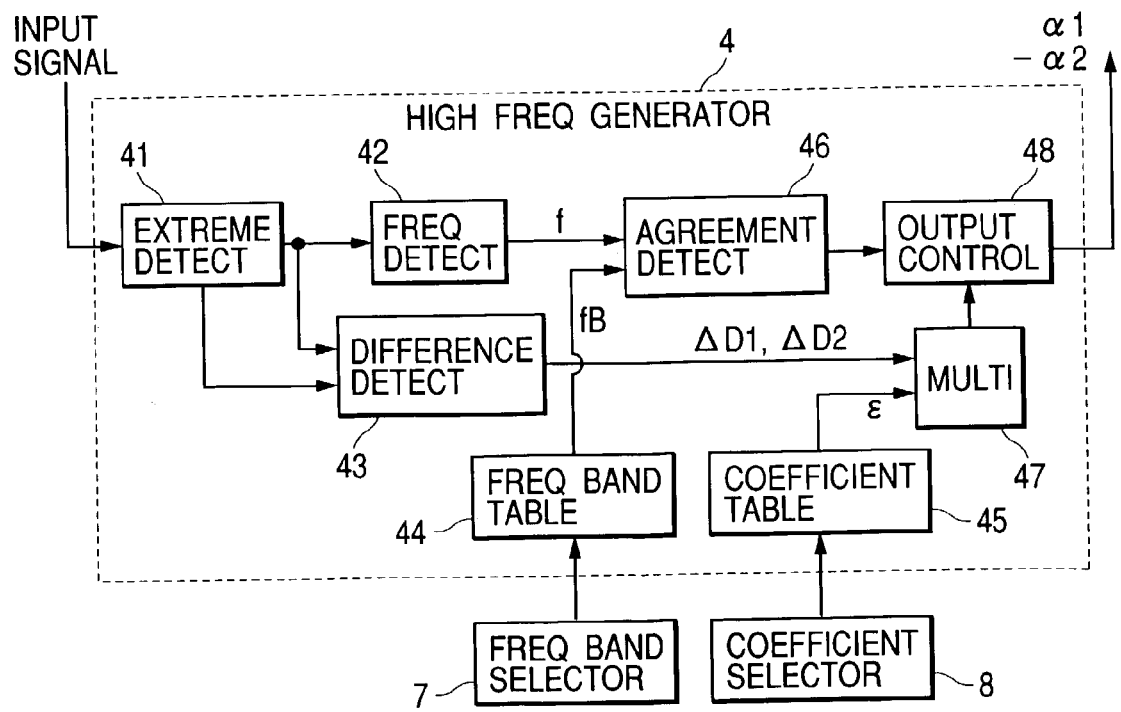
FIG. 3 is an operation flow diagram of a high-frequency-signal generator in FIG. 2.

FIG. 3 is a function flow diagram or an operation flow diagram of the high-frequency-signal generator 4. With reference to FIG. 3, an extreme-value detection block 41 accepts the input digital audio signal. The extreme-value detection block 41 detects every maximum value and every minimum value (that is, every peak and every valley) in the audio waveform represented by the input digital audio signal. The maximum and minimum values are also referred to as the extreme values. The extreme-value detection block 41 identifies samples in the input digital audio signal which represent the detected maximum values and the detected minimum values. The identified samples are referred to as the extreme-representing samples, or the maximum-representing samples and the minimum-representing samples. The extreme-value detection block 41 informs a frequency detection block 42 of the extreme-representing samples. In addition, the extreme-value detection block 41 passes the input digital audio signal to the frequency detection block 42. The extreme-value detection block 41 informs a difference detection block 43 of the extreme values and the extreme-representing samples. In addition, the extreme-value detection block 41 passes the input digital audio signal to the difference detection block 43.

The frequency detection block 42 repetitively calculates the time interval between two temporally-adjacent extreme-representing samples. Specifically, the frequency detection block 42 counts samples between two temporally-adjacent extreme-representing samples. The frequency detection block 42 calculates, from the latest count result, the present audio frequency (present local audio frequency) represented by the input digital audio signal. The frequency detection block 42 informs an agreement detection block 46 of the present audio frequency represented by the input digital audio signal.

The difference detection block 43 calculates the difference between every extreme value and a value represented by a sample immediately preceding the extreme-representing sample. Thus, the difference detection block 43 calculates the difference between every maximum value and a value represented by a sample immediately preceding the maximum-representing sample, and also the difference between every minimum value and a value represented by a sample immediately preceding the minimum-representing sample. The difference detection block 43 informs a multiplication block 47 of every calculated difference.

A frequency band table 44 provided in a memory stores data indicating a plurality of predetermined frequency bands different from each other. For example, the predetermined frequency bands are equal to respective bands into which the audio frequency range of the input digital audio signal is divided. The predetermined frequency bands may partially overlap each other. One is selected from the predetermined frequency bands in response to the control signal fed from the frequency band selector 7. The selected frequency band is notified to the agreement detection block 46.

A coefficient table 45 provided in a memory stores data indicating a plurality of predetermined coefficients different from each other. The predetermined coefficients are in the range between 0 and 1.0 exclusive. Thus, the predetermined coefficients are smaller than 1.0. One is selected from the predetermined coefficients in response to the control signal fed from the coefficient selector 8. The selected coefficient is notified to the multiplication block 47.

The agreement detection block 46 decides whether or not the present audio frequency represented by the input digital audio signal is in the selected frequency band. Only when it is decided that the present audio frequency is in the selected frequency band, the agreement detection block 46 generates a correction command. The agreement detection block 46 informs an output control block 48 of the generated correction command.

The multiplication block 47 multiplies every calculated difference by the selected coefficient to get a corrective value. The multiplication block 47 informs the output control block 48 of every corrective value.

Only in the presence of the correction command given by the agreement detection block 46, the output control block 48 generates a corrective digital signal representing the corrective values. The corrective digital signal is fed to the adder 5 (see FIG. 2).

In more detail, the extreme-value detection block 41 compares the value represented by every sample in the input digital audio signal with the value represented by an immediately-preceding sample therein to decide the sample value is increasing or decreasing. Data representing the results of the decision are stored in a memory. By referring to the decision results, the extreme-value detection block 41 detects every maximum-representing sample at which the sample value changes from an increasing state to a decreasing state. The extreme-value detection block 41 detects the maximum value VMAX represented by every detected maximum-representing sample. By referring to the decision results, the extreme-value detection block 41 detects every minimum-representing sample at which the sample value changes from a decreasing state to an increasing state. The extreme-value detection block 41 detects the minimum value VMIN represented by every detected minimum-representing sample.

Figure 4:
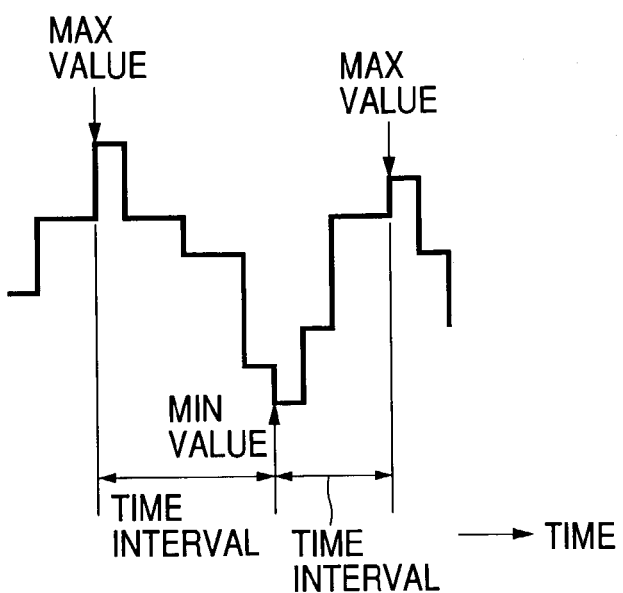
FIG. 4 is a time-domain diagram of an example of the values represented by successive digital-signal samples which include maximum and minimum values.

With reference to FIG. 4, the frequency detection block 42 counts samples between every maximum-representing sample and an immediately-preceding minimum-representing sample. The count result corresponds to the time interval between the maximum-representing sample and the immediately-preceding minimum-representing sample. Similarly, the frequency detection block 42 counts samples between every minimum-representing sample and an immediately-preceding maximum-representing sample. The count result corresponds to the time interval between the minimum-representing sample and the immediately-preceding maximum-representing sample. The frequency detection block 42 calculates, from the latest count result, the present audio frequency (present local audio frequency) "f" represented by the input digital audio signal. The frequency detection block 42 informs the agreement detection block 46 of the present audio frequency "f".

Figure 5:
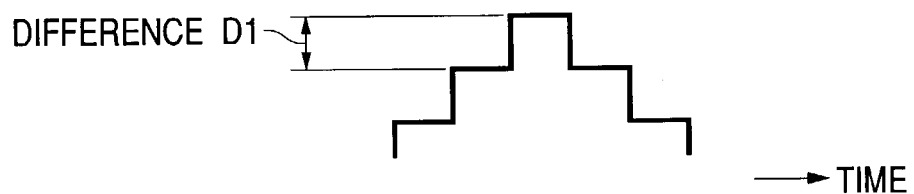
FIG. 5 is a time-domain diagram of an example of the values represented by successive digital-signal samples which include a maximum value.

With reference to FIG. 5, the difference detection block 43 calculates the difference ΔD1 between every maximum value VMAX and a value represented by a sample immediately preceding the maximum-representing sample. Similarly, the difference detection block 43 calculates the difference ΔD2 between every minimum value VMIN and a value represented by a sample immediately preceding the minimum-representing sample. The difference detection block 43 informs the multiplication block 47 of the calculated differences ΔD1 and ΔD2.

One is selected from the predetermined frequency bands in the frequency band table 44 in response to the control signal fed from the frequency band selector 7. The selected frequency band is denoted by the reference character "fB". By operating the frequency band selector 7, the user can decide which of the predetermined frequency bands should be selected. The selected frequency band fB is notified to the agreement detection block 46.

One is selected from the predetermined coefficients in the coefficient table 45 in response to the control signal fed from the coefficient selector 8. The selected coefficient is denoted by the reference character "ϵ". By operating the coefficient selector 8, the user can decide which of the predetermined coefficients should be selected. Since the predetermined coefficients in the coefficient table 45 are in the range between 0 and 1.0 exclusive, the selected coefficient "ϵ" is smaller than 1.0. The selected coefficient "ϵ" is notified to the multiplication block 47.

The agreement detection block 46 decides whether or not the present audio frequency "f" represented by the input digital audio signal is in the selected frequency band fB. Only when it is decided that the present audio frequency "f" is in the selected frequency band fB, the agreement detection block 46 generates the correction command. The agreement detection block 46 informs the output control block 48 of the generated correction command.

The multiplication block 47 multiplies every calculated difference ΔD1 by the selected coefficient "ϵ" to get a corrective value α1. Similarly, the multiplication block 47 multiplies every calculated difference ΔD2 by the selected coefficient "ϵ" to get a corrective value α2. Since the selected coefficient "ϵ" is smaller than 1.0, the corrective value α1 is smaller than the difference ΔD1. Also, the corrective value α2 is smaller than the difference ΔD2. The multiplication block 47 informs the output control block 48 of the corrective values α1 and α2.

Figure 6:
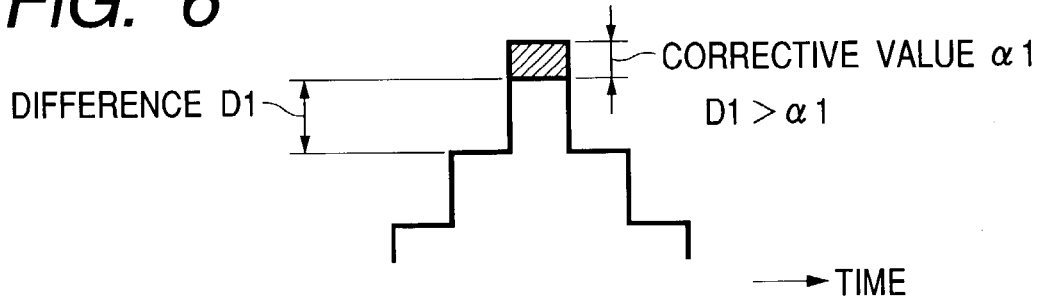
FIG. 6 is a time-domain diagram of an example of the values represented by successive digital-signal samples which include a correction-result maximum value.
Figure 7:
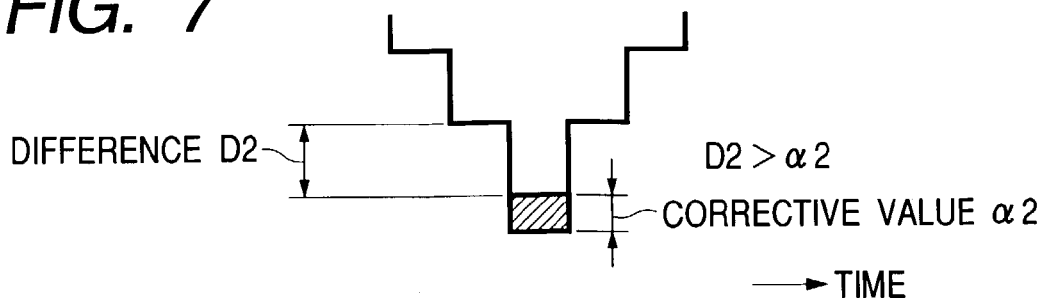
FIG. 7 is a time-domain diagram of an example of the values represented by successive digital-signal samples which include a correction-result minimum value.

Only in the presence of the correction command given by the agreement detection block 46, the output control block 48 feeds a corrective digital signal representative of every corrective value α1 to the adder 5 (see FIG. 2) at a timing when a corresponding maximum-representing sample in the delay-result digital audio signal reaches the adder 5. Thus, as shown in FIG. 6, the device 5 adds the corrective value α1 to only the corresponding maximum value in the audio waveform represented by the delay-result digital audio signal. Accordingly, the maximum value or the maximum-representing sample is corrected. The output control block 48 inverts every corrective value α2 into negative one −α2. Only in the presence of the correction command given by the agreement detection block 46, the output control block 48 feeds a corrective digital signal representative of every corrective value −α2 to the adder 5 (see FIG. 2) at a timing when a corresponding minimum-representing sample in the delay-result digital audio signal reaches the adder 5. Thus, as shown in FIG. 7, the adder 5 subtracts the corrective value α2 from only the corresponding minimum value in the audio waveform represented by the delay-result digital audio signal. Accordingly, the minimum value or the minimum-representing sample is corrected.

The above-mentioned operation steps are iterated. The addition of the corrective values to the corresponding maximum values and the subtraction of the corrective values α2 from the corresponding minimum values provide enhanced reality and clarity of audio contents represented by the output digital audio signal. Preferably, the predetermined frequency bands in the frequency band table 44 and the predetermined coefficients in the coefficient table 45 are set to experimentally-decided optimal ones.

Figure 8:
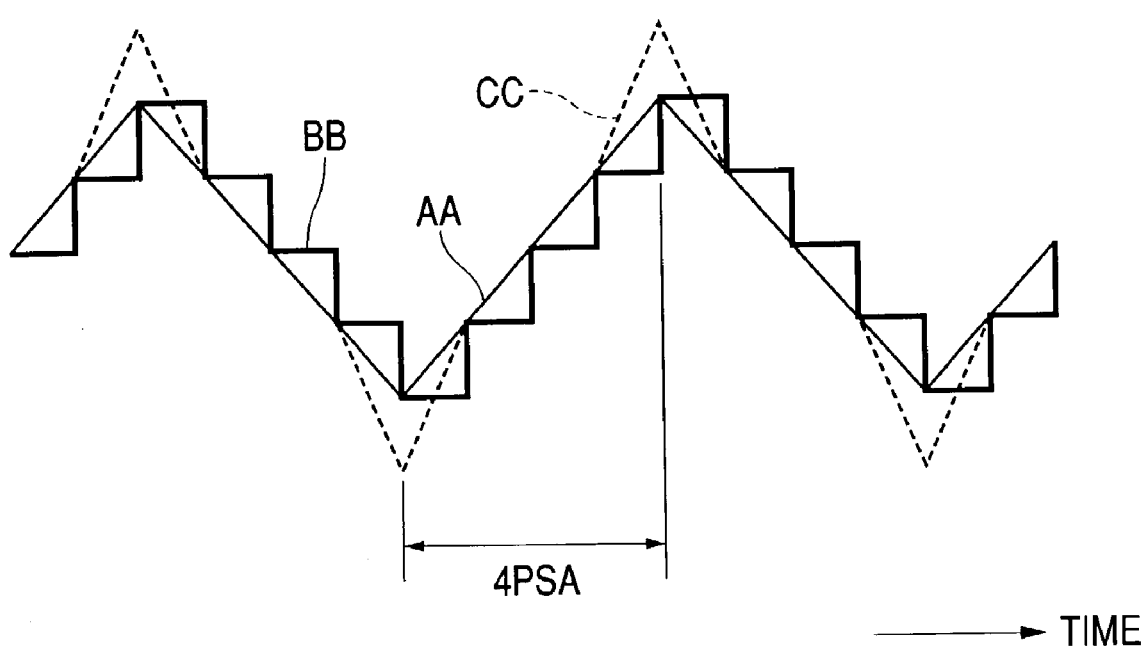
FIG. 8 is a time-domain diagram of the audio waveforms represented by digital signals in the apparatus of FIG. 2.

With reference to FIG. 8, the input digital audio signal has a sequence of samples representing signal levels or signal values which vary as steps BB. There are 4 samples in a time interval 4 PSA equal to 4 times one sampling period PSA related to the input digital audio signal. The input digital audio signal represents an effective audio waveform AA. As previously mentioned, corrective values α1 are added to corresponding maximum values in the effective audio waveform AA. Corrective values α2 are subtracted from corresponding minimum values in the effective audio waveform AA. The output digital audio signal which results from the corrective-value addition and subtraction represents an effective audio waveform CC. The effective audio waveform CC has emphasized peaks and valleys relative to those in the original effective audio waveform AA.

It should be noted that the output control block 48 may notify every corrective value α2 to the adder 5 as it is. In this case, the adder 5 is replaced by an adding and subtracting device which functions to add every corrective value α1 to a corresponding maximum value, and to subtract every corrective value α2 from a corresponding minimum value.

Figure 9:
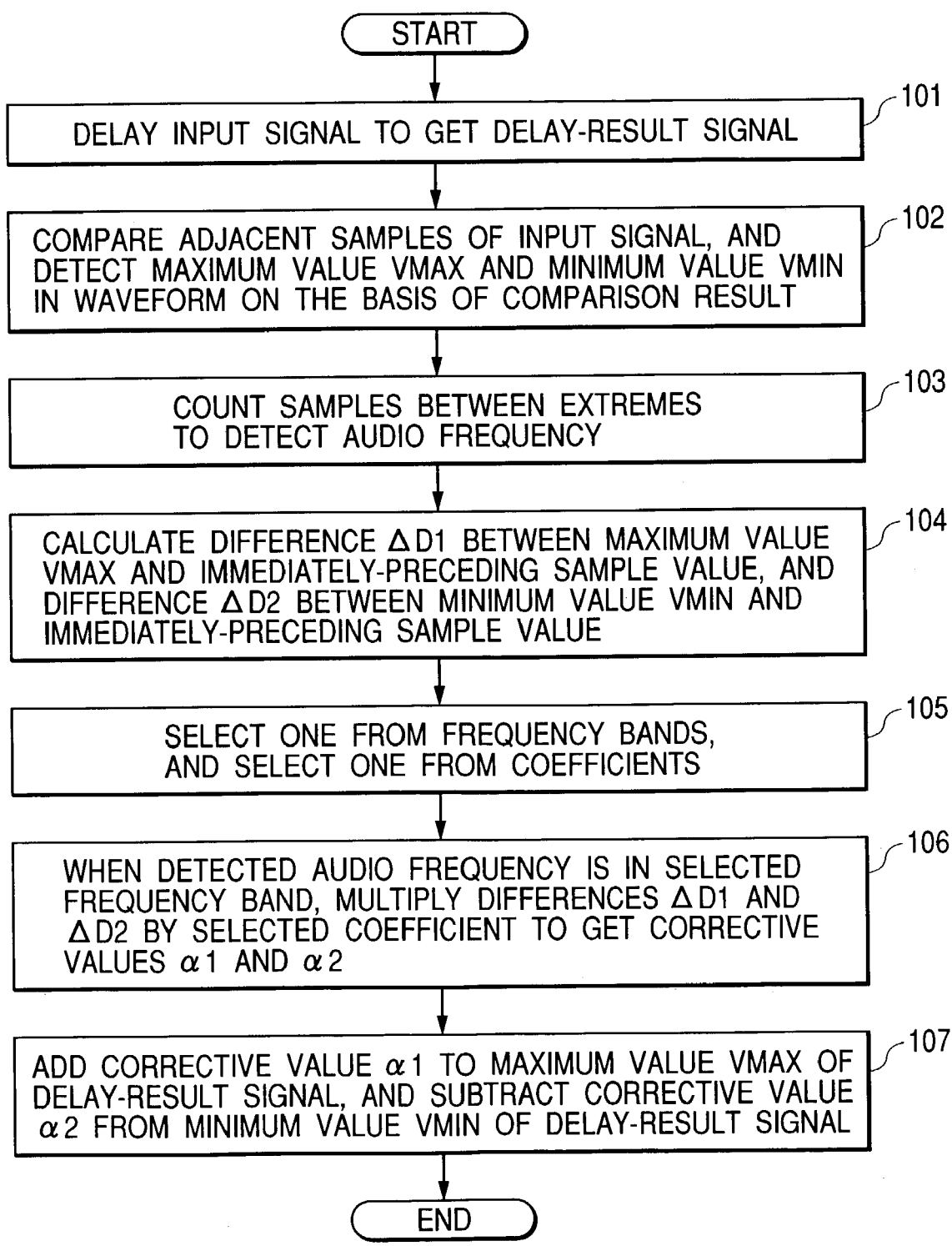
FIG. 9 is a flowchart of a segment of a control program for at least a part of a waveform shaping circuit in FIG. 2.

At least a part of the waveform shaping circuit 1 may be formed by a microprocessor unit (MPU), a digital signal processor (DSP), or a similar device which operates in accordance with a control program (a computer program) stored in its internal memory. FIG. 9 is a flowchart of a segment of the control program. Basically, the program segment is repetitively executed.

As shown in FIG. 9, a first step 101 of the program segment delays the input digital audio signal by a predetermined time to get a delay-result digital audio signal. The step 101 corresponds to the delay circuit 3 (see FIG. 2).

A step 102 following the step 101 compares the value represented by every sample Dn in the input digital audio signal with the value represented by an immediately-preceding sample Dn−1 therein to decide the sample value is increasing or decreasing. By referring to the decision results, the step 102 detects every maximum-representing sample at which the sample value changes from an increasing state to a decreasing state. The step 102 detects the maximum value VMAX represented by every detected maximum-representing sample. By referring to the decision results, the step 102 detects every minimum-representing sample at which the sample value changes from a decreasing state to an increasing state. The step 102 detects the minimum value VMIN represented by every detected minimum-representing sample.

A step 103 subsequent to the step 102 counts samples between every maximum-representing sample and an immediately-preceding minimum-representing sample. Similarly, the step 103 counts samples between every minimum-representing sample and an immediately-preceding maximum-representing sample. The step 103 calculates, from the latest count result, the present audio frequency (present local audio frequency) "f" represented by the input digital audio signal.

A step 104 following the step 103 calculates the difference ΔD1 between every maximum value VMAX and a value represented by a sample immediately preceding the maximum-representing sample. Similarly, the step 104 calculates the difference ΔD2 between every minimum value VMIN and a value represented by a sample immediately preceding the minimum-representing sample.

A step 105 subsequent to the step 104 selects one from the predetermined frequency bands in the frequency band table 44 (see FIG. 3) in response to the control signal fed from the frequency band selector 7. The selected frequency band is denoted by the reference character "fB". The step 105 selects one from the predetermined coefficients in the coefficient table 45 (see FIG. 3) in response to the control signal fed from the coefficient selector 8. The selected coefficient is denoted by the reference character "ε".

A step 106 following the step 105 decides whether or not the present audio frequency "f" represented by the input digital audio signal is in the selected frequency band fB. Only when it is decided that the present audio frequency "f" is in the selected frequency band fB, the step 106 multiplies every calculated difference ΔD1 by the selected coefficient "ε" to get a corrective value α1. Similarly, only when it is decided that the present audio frequency "f" is in the selected frequency band fB, the step 106 multiplies every calculated difference ΔD2 by the selected coefficient "ε" to get a corrective value α2.

A step 107 subsequent to the step 106 adds the corrective value α1 to only the corresponding maximum value in the audio waveform represented by the delay-result digital audio signal. The step 107 subtracts the corrective value α2 from only the corresponding minimum value in the audio waveform represented by the delay-result digital audio signal. After the step 107, the current execution cycle of the program segment ends.

In the correction of the input digital audio signal into the output digital audio signal, only maximum values and minimum values in the audio waveform represented by the input digital audio signal are changed or corrected. This featuring function provides enhanced reality and clarity of audio contents represented by the output digital audio signal.

It should be noted that the apparatus of FIG. 2 may be provided in a personal computer or a mobile telephone device. In this case, the control program for the waveform shaping circuit 1 or the high-frequency-signal generator 4 is stored in a memory within the personal computer or the mobile telephone device. Preferably, the control program is previously stored in the memory. The control program may be downloaded into the memory via a communication network such as the Internet.

SECOND EMBODIMENT

Figure 10:
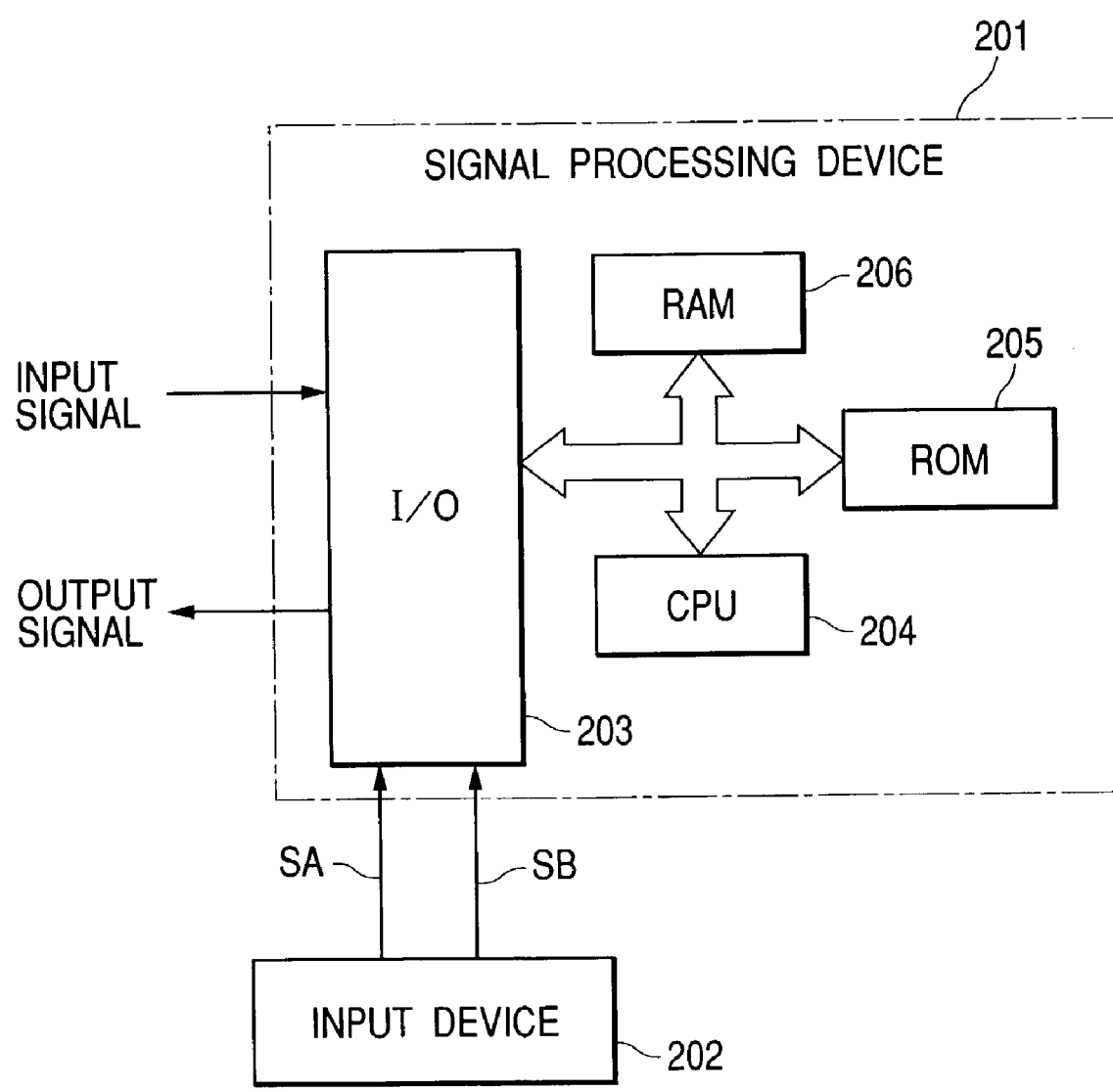
FIG. 10 is a block diagram of a digital-audio-signal processing apparatus according to a second embodiment of this invention.

FIG. 10 shows a digital-audio-signal processing apparatus according to a second embodiment of this invention. The apparatus of FIG. 10 is similar to the apparatus of FIG. 2 except for design changes mentioned hereafter.

The apparatus of FIG. 10 includes a signal processing device 201, and an input device 202 connected with the signal processing device 201. The signal processing device 201 includes a digital signal processor or a similar device which has a combination of an input/output (I/O) port 203, a CPU 204, a ROM 205, and a RAM 206. The signal processing device 201 operates in accordance with a control program (a computer program) stored in the ROM 205 or the RAM 206.

In the signal processing device 201, the ROM 205 or the RAM 206 stores data indicating a plurality of predetermined frequency bands different from each other, and also data indicating a plurality of predetermined coefficients different from each other. The predetermined coefficients are between 0 and 1.0 exclusive.

The input device 202 includes first and second switches which can be operated by a user. The first switch is designed to generate a first control signal SA for selecting one from the predetermined frequency bands. The selected frequency band can be changed by operating the first switch. The second switch is designed to generate a second control signal SB for selecting one from the predetermined coefficients. The selected coefficient can be changed by operating the second switch. The input device 202 feeds the first and second control signals SA and SB to the input/output port 203 in the signal processing device 201.

The signal processing device 201 receives an input digital audio signal having a sequence of samples. The input digital audio signal relates to a predetermined sampling frequency and a predetermined quantization bit number. The signal processing device 201 converts or processes the input digital audio signal into an output digital audio signal in response to the first and second control signals SA and SB. The signal conversion by the signal processing device 201 is designed so that extremes (peaks and valleys, or local maximums and minimums) in the audio waveform represented by the output digital audio signal can be emphasized relative to those in the audio waveform represented by the input digital audio signal. The signal processing device 201 transmits the output digital audio signal to an external device. During the processing of the input digital audio signal by the signal processing device 201, at least a predetermined number of successive samples in the input digital audio signal are stored in the RAM 206 on a first-in first-out basis. The input/output port 203 receives the input digital audio signal, and transmits the output digital audio signal to the external device.

As previously mentioned, the signal processing device 201 operates in accordance with a control program. FIG. 11 is a flowchart of a segment of the control program which is executed each time a sample in the input digital audio signal arrives at the signal processing device 201 (the input/output port 203).

With reference to FIG. 11, a first step 251 of the program segment subtracts the value SV(0) represented by the current sample S(0) from the value SV(−1) represented by the sample S(−1) immediately preceding the current sample S(0) to get a current inter-sample difference SD(0). The step 251 stores information about the current inter-sample difference SD(0) into the RAM 206 for later use.

A step 252 following the step 251 accesses the RAM 206, and retrieves information about the inter-sample difference SD(−1) immediately preceding the current one SD(0). The step 251 decides whether or not the sign of the current inter-sample difference SD(0) is opposite to that of the immediately-preceding inter-sample difference SD(−1). When the sign of the current inter-sample difference SD(0) is opposite to that of the immediately-preceding inter-sample difference SD(−1), the program advances from the step 252 to a step 253. Otherwise, the program advances from the step 252 to a step 265.

The step 253 regards the immediately-preceding sample S(−1) as the latest extreme-representing sample. The step 253 stores information about the latest extreme-representing sample into the RAM 206 for later use. The step 253 accesses the RAM 206, and retrieves information about the second latest extreme-representing sample (the extreme-representing sample immediately preceding the latest extreme-representing sample). The step 253 counts samples between the latest extreme-representing sample and the second latest extreme-representing sample. The count result corresponds to half the current local audio period represented by the input digital audio signal. The step 253 calculates, from the count result, the current local audio frequency represented by the input digital audio signal.

A step 254 following the step 253 selects one from the predetermined frequency bands in response to the first control signal SA.

A step 255 subsequent to the step 254 decides whether or not the present local audio frequency of the input digital audio signal is in the selected frequency band. When the present local audio frequency is in the selected frequency band, the program advances from the step 255 to a step 256. Otherwise, the program advances from the step 255 to the step 265.

The step 256 selects one from the predetermined coefficients in response to the second control signal SB.

A step 257 following the step 256 multiplies the immediately-preceding inter-sample difference SD(−1) by the selected coefficient to get a corrective value "α".

A step 258 subsequent to the step 257 decides whether the sample value SV(−1) is maximum or minimum by referring to the sign of the current inter-sample difference SD(0). When the sample value SV(−1) is minimum, the program advances from the step 258 to a step 259. On the other hand, when the sample value SV(−1) is maximum, the program advances from the step 258 to a step 260.

The step 259 shifts the sample value SV(−1) in the negative-going direction by an amount corresponding to the corrective value "α" to get a correction-result minimum value CRMIN. The step 259 corrects the original sample S(−1) to represent the correction-result minimum value CRMIN. Thus, the step 259 changes the original minimum-representing sample S(−1) into correction-result one representative of an emphasized minimum. The step 259 transmits the correction-result minimum-representing sample S(−1) from the signal processing device 201 as a sample of the output digital audio signal. After the step 259, the current execution cycle of the program segment ends.

The step 260 shifts the sample value SV(−1) in the positive-going direction by an amount corresponding to the corrective value "α" to get a correction-result maximum value CRMAX. The step 260 corrects the original sample S(−1) to represent the correction-result maximum value CRMAX. Thus, the step 260 changes the original maximum-representing sample S(−1) into correction-result one representing an emphasized maximum. The step 260 transmits the correction-result maximum-representing sample S(−1) from the signal processing device 201 as a sample of the output digital audio signal. After the step 260, the current execution cycle of the program segment ends.

The step 265 keeps the immediately-preceding sample S(−1) unchanged. The step 265 transmits the immediately-preceding sample S(−1) from the signal processing device 201 as a sample of the output digital audio signal. After the step 265, the current execution cycle of the program segment ends.

ADVANTAGES PROVIDED BY THE INVENTION

In the correction of the input digital audio signal into the output digital audio signal, only maximum values and minimum values in the audio waveform represented by the input digital audio signal are changed or corrected. This featuring function provides enhanced reality and clarity of audio contents represented by the output digital audio signal.

It is possible to add high-audio-frequency signal components to only components of the input digital audio signal which represent audio frequencies in one selected from the predetermined frequency bands.

What is claimed is:

1. A method of processing a digital audio signal having a sequence of samples, the method comprising the steps of:

detecting extreme values in an audio waveform represented by the digital audio signal, the detected extreme values including a detected maximum value and a detected minimum value;

counting samples between a sample corresponding to first one of the detected extreme values and a sample corresponding to second one of the detected extreme values to get a count result;

detecting an audio frequency represented by the digital audio signal in response to the count result;

calculating a difference between each of the detected extreme values and a value of a sample which immediately precedes a sample corresponding to the present detected extreme value;

selecting one from predetermined frequency bands different from each other;

selecting one from predetermined coefficients different from each other;

multiplying the calculated differences by the selected coefficient to get corrective values respectively;

deciding whether or not the detected audio frequency represented by the digital audio signal is in the selected frequency band; and when it is decided that the detected audio frequency is in the selected frequency band, adding, to the detected maximum value, corresponding one of the corrective values, and subtracting, from the detected minimum value, corresponding one of the corrective values.

2. A method as recited in claim 1, wherein the predetermined coefficients are smaller than 1.0.

3. An apparatus for processing a digital audio signal having a sequence of samples, the apparatus comprising:

means for detecting extreme values in an audio waveform represented by the digital audio signal, the detected extreme values including a detected maximum value and a detected minimum value;

means for counting samples between a sample corresponding to first one of the detected extreme values and a sample corresponding to second one of the detected extreme values to get a count result;

means for detecting an audio frequency represented by the digital audio signal in response to the count result;

means for calculating a difference between each of the detected extreme values and a value of a sample which immediately precedes a sample corresponding to the present detected extreme value;

means for selecting one from predetermined frequency bands different from each other;

means for selecting one from predetermined coefficients different from each other;

means for multiplying the calculated differences by the selected coefficient to get corrective values respectively;

means for deciding whether or not the detected audio frequency represented by the digital audio signal is in the selected frequency band; and means for, when it is decided that the detected audio frequency is in the selected frequency band, adding, to the detected maximum value, corresponding one of the corrective values, and subtracting, from the detected minimum value, corresponding one of the corrective values.

4. An apparatus as recited in claim 3, wherein the predetermined coefficients are smaller than 1.0.

5. A computer readable memory storing a computer program for enabling a computer to execute steps of processing a digital audio signal having a sequence of samples, the steps comprising:

detecting extreme values in an audio waveform represented by the digital audio signal, the detected extreme values including a detected maximum value and a detected minimum value;

counting samples between a sample corresponding to first one of the detected extreme values and a sample corresponding to second one of the detected extreme values to get a count result;

detecting an audio frequency represented by the digital audio signal in response to the count result;

calculating a difference between each of the detected extreme values and a value of a sample which immediately precedes a sample corresponding to the present detected extreme value;

selecting one from predetermined frequency bands different from each other;

selecting one from predetermined coefficients different from each other;

multiplying the calculated differences by the selected coefficient to get corrective values respectively;

deciding whether or not the detected audio frequency represented by the digital audio signal is in the selected frequency band; and when it is decided that the detected audio frequency is in the selected frequency band, adding, to the detected maximum value, corresponding one of the corrective values, and subtracting, from the detected minimum value, corresponding one of the corrective values.

6. An apparatus for processing a digital audio signal, comprising:

first means for detecting an extreme in an audio waveform represented by the digital audio signal;

second means for detecting a local audio frequency represented by the digital audio signal;

third means for deciding whether or not the local audio frequency detected by the second means is in a limited frequency band;

fourth means for, when the third means decides that the local audio frequency is in the limited frequency band, emphasizing the extreme detected by the first means;

fifth means for, when the third means decides that the local audio frequency is not in the limited frequency band, keeps unchanged the extreme detected by the first means; and sixth means for keeping unchanged the audio waveform except for the extreme.

7. An apparatus as recited in claim 6, further comprising seventh means for changing the limited frequency band.

8. An apparatus as recited in claim 6, further comprising seventh means for changing a degree of the emphasis by the fourth means.

* * * * *